Dec. 31, 1968  P. H. PELTRET ET AL  3,419,292
MEANS FOR RETAINING A PLATELIKE PART UPON
A SHAFT OR THE LIKE
Filed Jan. 17, 1967
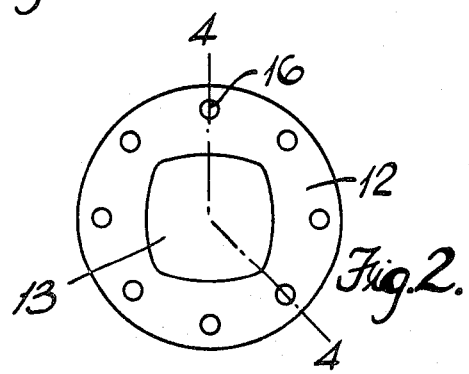
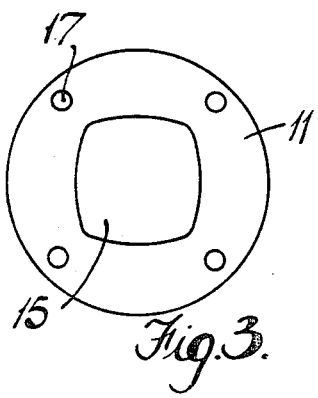
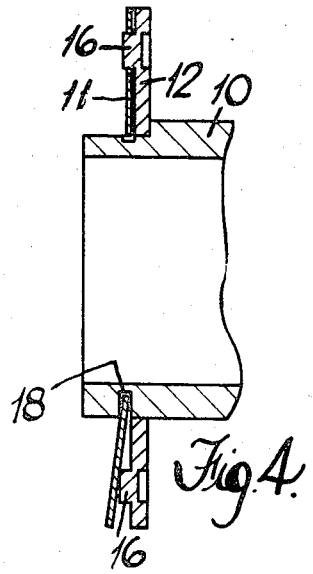

United States Patent Office 3,419,292
Patented Dec. 31, 1968

3,419,292
MEANS FOR RETAINING A PLATELIKE PART UPON A SHAFT OR THE LIKE
Pierre Henri Peltret, New Southgate, London, and Denis Wheatley, New Malden, England, assignors to C.A.V. Limited, London, England
Filed Jan. 17, 1967, Ser. No. 609,944
Claims priority, application Great Britain, Feb. 24, 1966, 8,125/66
1 Claim. (Cl. 287—52.07)

ABSTRACT OF THE DISCLOSURE

A platelike part having a substantially polygonal aperture therein is retained upon a complementary end portion of a shaft by means of a retaining piece which is provided with an aperture complementary to the shape of the end portion of the shaft, the retaining piece being placed upon the shaft and moved angularly so that portions thereof are presented to portions of the shaft, the shaft being provided with a groove to permit of such angular movement, and the retaining piece being retained in this position thereby to secure the platelike part upon the shaft.

---

The invention has for its object to provide a means for retaining a platelike part upon a shaft or the like against a shoulder thereon, the shaft or the like having a non-circular or substantially polygonal section and the platelike part having an aperture formed therein through which the shaft or the like can pass.

Means in accordance with the invention comprises retaining piece having an aperture formed therein complementary to the shape of the shaft or the like, the arrangement being that with the platelike part positioned adjacent the shoulder, the piece is positioned adjacent the part and is moved angularly to a position in which portions of the retaining piece are presented to portions of the shaft or the like so preventing axial movement of the piece and the part, the shaft or the like having a groove or the equivalent formed in its periphery to permit the angular movement of the retaining piece.

In the accompanying drawings:

FIGURE 1 is an end elevation of a hollow shaft to which a platelike part is to be secured.

FIGURE 2 is an end elevation of the platelike part.

FIGURE 3 is an end elevation of a retainer piece, and

FIGURE 4 is a sectional side elevation of the completed assembly taken on the line 4—4 of FIGURE 2.

Referring to the drawings there is provided a shaft 10 in the form of a tube having a cylindrical periphery, but an end portion thereof is machined to a non-circular section. In the particular example the end portion is substantially square in section with the corners defined by part of the cylindrical surface of the tube and the sides curved. It is desired to mount upon the shaft a platelike part 12 and for this purpose this is provided with an aperture 13 which is complementary in shape to the non-circular end portion of the shaft. Because of the non-circular shape of the end portion of the shaft a discontinuous shoulder 14 is defined and the platelike part is located against this shoulder by a retaining piece 11 formed from resilient material such as spring steel and provided with an aperture 15 complementary in shape to the non-circular end portion of the shaft.

In use with the platelike part 12 located against the shoulder 14 the retaining piece is passed axially onto the shaft to a position as shown in FIGURE 4. The piece is then moved angularly so that portions thereof adjacent the peripheral edge of the aperture 15, are presented to portions of the shaft. In order to permit the aforesaid angular movement of the piece a groove 18 is formed in the non-circular portion of the shaft. By this means axial movement of the piece 11 and platelike part 12 is prevented.

In order to retain the piece upon the shaft it is necessary to prevent further angular movement thereof and for this purpose there is provided on the part 12 a projection 16 which when the items are assembled engages within an aperture 17 formed in the piece. Conveniently a further projection 16 is provided on the platelike part at a position angularly disposed to the first projection and in this manner the retaining piece will be bowed when the items are assembled, so that the platelike part is positively pressed against the shoulder. As shown, four apertures 17 are formed in the piece and eight projections on the platelike part. In this manner the pressure exerted by the retaining piece on the platelike part is balanced.

Having thus described our invention what we claim as new and desire to secure by Letters Patent is:

1. Means for retaining a platelike part upon a shaft having a substantially polygonal end portion with a shoulder adjacent thereto, the platelike part having a shaft aperture complementary to the polygonal end portion and through which the end portion extends with said shoulder abutting said platelike part, said retaining means comprising a flexible resilient platelike retaining part having a shaft aperture formed therein complementary to the shape of the polygonal end portion, and a first series of arcuately spaced axial projections formed integrally on one face of one said platelike part and retaining part the arrangement being that with the platelike part positioned against the shoulder, the retaining part is positioned adjacent the platelike part and is moved angularly to a position in which shaft aperture portions of the retaining part are presented to portions of the polygonal end portion, said portions of the polygonal end portion being defined by a groove formed in the periphery of the end portion and which allows relative angular movement of the retaining part and the shaft member, said axial projections on one part engaging the face of the other part to distort the retaining part whereby its resilience urges the platelike part against the shoulder, said one part having a second series of axial projections, and a complementary series of apertures in the face of the other part, said second series of axial projections also engaging in said series of apertures when the retaining part is moved to said position thereby to prevent relative angular movement of the parts and the member.

References Cited

UNITED STATES PATENTS

| 939,048 | 11/1909 | Martin | 151—53 |
| 955,577 | 4/1910 | Bradshaw | 151—53 |
| 1,393,261 | 10/1921 | Casey | 151—57 XR |
| 1,816,687 | 7/1931 | Marron | 287—53 |
| 2,166,130 | 7/1939 | Coe | 287—53 |

CARL W. TOMLIN, *Primary Examiner.*

U.S. Cl. X.R.

287—53